US011855990B2

(12) United States Patent
Ziembicki et al.

(10) Patent No.: US 11,855,990 B2
(45) Date of Patent: Dec. 26, 2023

(54) ACCESS CONTROL USING TASK MANAGER

(71) Applicant: Comcast Cable Communications, LLC, Philadelphia, PA (US)

(72) Inventors: Jeffrey Ziembicki, Glenside, PA (US); Bin Wen, Mount Laurel, NJ (US); Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/033,113

(22) Filed: Sep. 25, 2020

(65) Prior Publication Data

US 2022/0103562 A1    Mar. 31, 2022

(51) Int. Cl.
*H04L 9/40* (2022.01)
*H04L 41/0896* (2022.01)
*H04W 12/08* (2021.01)
*H04W 4/24* (2018.01)

(52) U.S. Cl.
CPC ........ *H04L 63/102* (2013.01); *H04L 41/0896* (2013.01); *H04W 4/24* (2013.01); *H04W 12/08* (2013.01)

(58) Field of Classification Search
CPC .... H04L 63/102; H04L 41/0896; H04W 4/24; H04W 12/08
USPC ......................................................... 709/229
See application file for complete search history.

(56) References Cited

U.S. PATENT DOCUMENTS

| | | | |
|---|---|---|---|
| 10,992,678 B1* | 4/2021 | Gilman | H04L 63/10 |
| 2017/0061149 A1* | 3/2017 | Yuan | H04L 63/102 |
| 2018/0101691 A1* | 4/2018 | Das | G06F 16/122 |
| 2019/0069162 A1* | 2/2019 | Lindheimer | H04W 48/04 |
| 2020/0007322 A1* | 1/2020 | Weldemariam | G06F 16/1805 |
| 2020/0328985 A1* | 10/2020 | Cavage | G06F 9/5077 |
| 2020/0403996 A1* | 12/2020 | Parimi | H04L 63/102 |
| 2021/0081947 A1* | 3/2021 | Hockey | G06F 21/62 |
| 2021/0280287 A1* | 9/2021 | Mahmood | H04L 9/50 |
| 2022/0006813 A1* | 1/2022 | Jorasch | G06T 7/70 |

* cited by examiner

*Primary Examiner* — Frantz B Jean
(74) *Attorney, Agent, or Firm* — BakerHostetler

(57) ABSTRACT

Methods and systems are described for providing conditional access to a service. One or more tasks may be associated with a user profile. The one or more tasks may be indicated as required to be completed to access the service. The one or more tasks may have associated deadlines. If a task is not completed by the deadline, then any device associated with the user profile may be blocked from access to the service.

25 Claims, 12 Drawing Sheets

ACCESS CONTROL USING TASK MANAGER

BACKGROUND

A household may seek to limit access to a service, such as access to a network, for one or more users in the household. Conventional solutions, however, do not provide for granular mechanisms for conditional control of access to services. Thus, there is a need for more sophisticated techniques for controlling access to services.

SUMMARY

Disclosed are methods and systems for providing conditional access to a service, such as a network service. Access to the service may be conditioned on completion of one or more tasks. A primary user profile may assign tasks to a secondary user profile. The primary user profile may be a parent, head of household, or other user profile associated with management of an account for the service. Completion of one or more of the tasks may be required to access the service. The tasks may have associated deadlines (e.g., or grace periods). If a task is not completed by the deadline, then any device associated with the secondary user profile may be blocked from access to the service. A gateway device, a user device, or other access device associated with the account may be configured to receive messages from a server indicating whether the secondary user profile and/or associated devices are currently blocked or allowed to access the service. The server may actively send messages to block the user profile (e.g., if the deadline is passed without completion of the task). The server may receive queries from the gateway device, user device, and/or other device to determine whether to allow access or block access to a request associated with a user profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
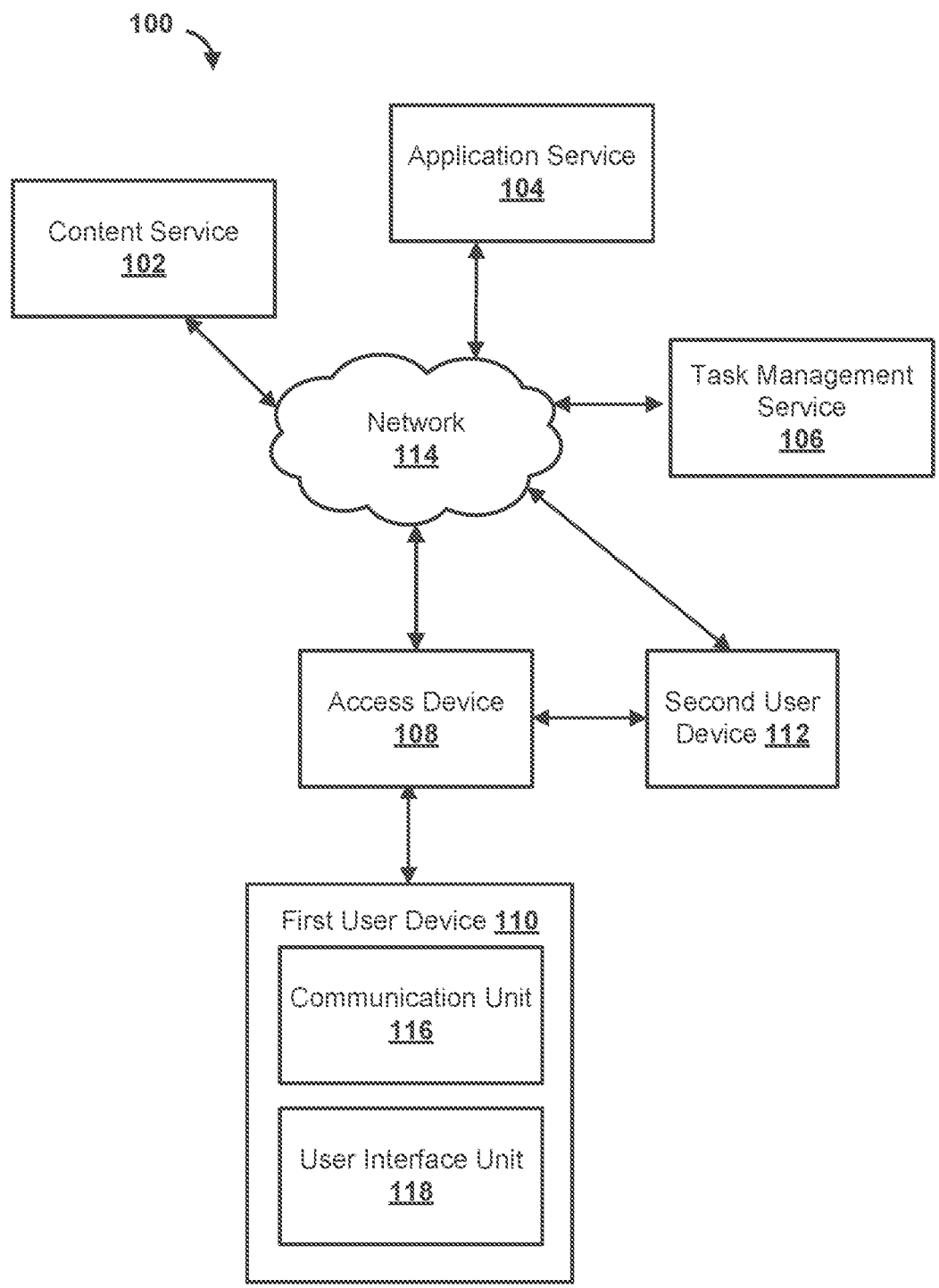
FIG. 1 is a block diagram showing an example system.

Disclosed herein are techniques for conditional access to one or more services. Example services may comprise a network service (e.g., cable service, dial-up service, wide area network service, Internet service), a gaming service, a content service (e.g., cable television, video recording service, video service, audio service), or a combination thereof. Access to the service may be based on (e.g., conditioned upon) completion of one or more tasks. The one or more tasks may be added to a task list (e.g. or a to-do list).

The task list may be integrated within and/or be accessible by an application associated with a service. If the service, is a network service, the application may comprise an application for management of the network service. The application may allow users to define one or more user profiles. Each task list may be associated with a corresponding user profile. Tasks on the task list may be marked as conditions for accessing the corresponding service. The user associated with the user profile may have limited access and/or be blocked from accessing the service if one (e.g., or any) of the tasks are not completed. In some scenarios, a task may be associated with days of the week and/or repeated daily.

A primary profile, such as one associated with the head of household, may set different options for the conditions for accessing the corresponding service. Tasks may be associated with a grace period that allows a time window before the service is blocked for the user profile. A task may be associated with a daily reset, which may reset a deadline associated with a task until the following day. The deadline may be automatically reset at midnight (e.g., or another time).

Tasks may identify a variety of different activities, such as chores, homework, exercise, and/or any other activity. If the task assigned to a user profile is a task to complete homework, the task may be associated with a deadline several hours after school ends (e.g., 4:30 PM), thereby giving the user associated with the user profile time to come home from school and to complete the homework before access to the service is blocked. The homework task may be assigned by a primary user profile and/or be received via an external service, such as a homework service. The primary user profile may assign a generic homework task (e.g., "complete homework"). A teacher may assign a specific homework task (e.g., complete 10 math problems using a specific math program) using the external service. The external service may be accessed (e.g., by a computing device associated with a service) to determine any homework tasks assigned by the teacher. The homework tasks may be added (e.g., by the computing device) to the corresponding user profile. The homework task may be translated from a specific math problem to a more generic task, such as "complete homework" or "complete math homework." In some scenarios, the external service may also store data indicating completion of the assignment. The data indication completion may be accessed and/or received (e.g., by the computing device) from the external service. The corresponding task may be updated to indicate (e.g., by the computing device) that the task is completed. It should be understood that the homework task described above is used only for purposes of illustration. The disclosed methods and systems may implement any task using any number of internal and/or external services as disclosed in more detail herein.

FIG. 1 is a block diagram showing an example system 100 for providing one or more services. The system 100 may comprise a content service 102 (e.g., or content device), an application service 104 (e.g., or application device), a task management service 106 (e.g., or task management device), an access device 108, a first user device 110, a second user device 112, or a combination thereof. The content service 102, the application service 104, the task management service 106, the access device 108, the first user device 110, the second user device 112, or a combination thereof may be communicatively coupled via a network 114 (e.g., a wide area network).

The network 114 may comprise a content distribution and/or access network. The network 114 may facilitate communication via one or more communication protocols. The network 114 may comprise fiber, cable, a combination thereof. The network 114 may comprise wired links, wireless links, a combination thereof, and/or the like. The network 114 may comprise routers, switches, nodes, gateways, servers, modems, and/or the like.

The content service 102 may be configured to send content to a plurality of users. The content may comprise video data, audio data, text data, gaming data, closed caption (CC) data, a combination thereof, and/or the like. The content may comprise a plurality of content channels, such as live channels, streaming channels, cable channels, and/or the like. The content service 102 may comprise one or more servers. The content service 102 may comprise one or more edge devices of a content distribution network and/or content access network. The content service 102 may comprise a transcoder configured to encode, encrypt, compress, and/or the like the content. The content service 102 may comprise a packager configured to package the content, segment the content, and/or the like. The content service 102 may be configured to manage recorded content (e.g., schedule recordings, access recordings, etc). The content service 102 may send the content as a plurality of packets, such as transport stream packets, Moving Picture Experts Group (MPEG) transport stream packets, and/or the like.

The first user device 110 may be configured to receive the content from the content service 102. It should be understood that the second user device 112 may have any of the features described herein for the first user device 110 (e.g., and vice versa). The first user device 110 may comprise a computing device, smart device (e.g., smart glasses, smart watch, smart phone), a mobile device, a tablet, a computing station, a laptop, a digital streaming device, a set-top box, a streaming stick, a television, and/or the like.

The first user device 110 may be configured to receive the content via a communication unit 116. The communication unit 116 may comprise a modem, network interface, and/or the like configured for communication via the network 114. The communication unit 116 may be configured to communicate, via the access device 108, with the network 114. The first user device 110 may comprise a user interface unit 118. The user interface unit 118 may comprise an application, service, and/or the like, such as a content browser. The user interface unit 118 may be configured to cause display of a user interface. The user interface unit 118 may receive user interface data from the application service 104. The user interface data may be processed by the user interface unit 118 to cause display of the user interface. The user interface may be displayed on a display element, such as a television, a screen, a monitor, a projector, and/or the like. The user interface may be configured to allow the user to browse, navigate, access, playback, and/or the like available content, such as content from the content service 102. The user interface may allow navigation between different content channels, content items, and/or the like.

The second user device 112 may comprise the communication unit 116, the user interface unit 118, or a combination thereof. The second user device 112 may be configured to communicate with the network 114 via the access device 108. In some scenarios, the second user device 112 may be configured to communicate with the network 114 via a different access device, such as a cell phone tower, wireless hotspot, and/or the like. The first user device 110 may be located at a premises. The second user device 112 may be located at the premises (e.g., or may travel outside of the premises).

The first user device 110 and the second user device 112 may be associated with a user account. The user account may be associated with one or more services, such as the content service 102, the application service 104, the task management service 106, or a combination thereof. The user account may be associated with a plurality of user profiles, such as a first user profile and a second user profile. The first user profile may be a primary user profile. The second user profile may be secondary user profile. The primary user profile may have more rights than the primary user profile. The primary user profile may control access of the secondary user profile. The primary user profile maybe associated with the second user device 112. The secondary user profile may be associated with the first user device 110.

The task management service 106 may be configured to manage tasks for a plurality of users. The task management service 106 may comprise an application programming interface that may be accessed by the application service 104, the access device 108, the first user device 110, the second user device 112, or a combination thereof. The application service 104 may query the task management service 106 for task information associated with a particular account and/or user profile. The application service 104 may add the task information to application data. In some scenarios, the application data may be determined by the task management service 106. The application data may be sent (e.g., by the application service 104, or the task management service 106) to the first user device 110 and/or second user device 112. The application data may be rendered to a user as part of a user interface. The user interface may allow users to update, add, delete, and/or otherwise edit one or more task.

A task may comprise a task input by a user (e.g., subscriber of a service). The user interface may allow a user to input a text description of a task, such as a name, title, or other description of the task. The task may be associated (e.g., via a user interface) with timing information. The timing information may indicate a deadline (e.g., or grace period) for completing the task. The timing information may indicate a recurrence of the task, such as one or more days on which the task is to be completed. The task management service 106 may be configured to allow a user of a primary profile of a user account to assign tasks to a user associated with a secondary profile of the user account. Access rights of the secondary profile may be controllable by the primary profile. The access rights may be controlled based on one or more tasks assigned by the primary profile. If a task is not completed by a deadline, then the profile to which the task is assigned may lose access to a service.

The task may be a recurring task associated with one or more days of the week. The task may be reset (e.g., by the task management service 106) after a day associated with the task ends. Resetting a task may comprise changing the day the task is due to the next day or other later day (e.g., if the task recurs on Wednesdays, it may be changed to the next Wednesday). An access condition (e.g., or access right) may be associated with completion of multiple tasks (e.g., X number of items assigned by a particular calendar date or time).

The task management service 106 may be a service that is managed by a different entity (e.g., service provider) than one or more of the application service 104 or the content service 102. The task management service 106 may be a homework management service, a project management service, and/or the like. The task management service 106 may comprise a submission service that allows users to submit documents, files, videos, audio, and/or the like. If the submission service detects that a user has submitted that data associated with the task, the task may be marked as completed. If the task involves answering questions, the task may be marked as completed if all the questions have been answered (e.g., or have been answered completely). In some scenarios, the homework management service, the project management service, the submission service, a combination thereof, and/or the like may be a separate service (e.g., on different device, managed by a different entity) external to the task management service 106. The separate service may be configured to communicate with the task management service 106 to indicate homework assignments, completion of homework assignments, project assignment, completion of project assignments, documents submitted, and/or the like.

The application service 104 (e.g., or the task management service 106) may be configured to receive a query associated with a user device attempting to access the network service. The query may be received from the access device 108 (e.g., or directly from the first user device 110, or second user device 112). If the first user device 110 and/or the second user device 112 attempts to connect to the network 114, the access device 108 may send the query to the application service 104.

The application service 104 (e.g., or the task management service 106) may be configured to determine a user profile associated with the requesting user device. The application service 104 may access a datastore comprising associations of identifiers of user devices with corresponding user profiles. The application service 104 may query the task management service 106 to determine if any tasks associated with the user profile are pending completion. The task management service 106 may send data indicative of one or more tasks associated with the user profile, such as the first user profile or the second user profile. The one or more tasks may be associated, via the task management service 106, with the user profile. The task may be associated with an access condition for a network service. The data indicative of the one or more tasks may comprise timing information.

The access condition may comprise one or more of: a condition to enforce if the task is pending completion, a condition to enforce if the task is pending completion after a deadline, a bandwidth level, a service level, a time limit (e.g., deadline, grace period), a data usage limit, a limit on usage of an application, a limit on usage of a category of applications, blocking condition, a combination thereof, and/or the like. The access condition may comprise a condition to enforce if a task is completed (e.g., by a deadline). The access condition may allow increased time limit, service options, bandwidth levels, service levels, and/or the like if the task is completed. If a user profile has a default (e.g., or is temporarily limited based on a task pending completion) of only being able to send text messages and make calls on a user device, completion of the task may allow for access to applications, web browsing, internet access, television access, gaming services, a combination thereof, and/or like accessible via the user device.

The application service 104 (e.g., or the task management service 106) may be configured to determine whether a time associated with the query matches the timing information. If the time associated with the query is before a deadline, within a grace period, and/or the like, then the application service 104 may determine to approve access to requested service. If the time associated with the query is after a deadline and the task is pending completion, then the application service 104 may determine to deny access to requested service.

The application service 104 (e.g., or the task management service 106) may be configured to send a message indicating approval or denial of access to the network service. The requesting user device may be associated with an identifier comprising at least one of a network address or a media access control address. The application service 104 may be configured to send the identifier in a blocklist to the access device 108. In some scenarios, the access condition may be associated with a service parameter. The service parameter may set a limit on data usage, television access, bandwidth, network access, a combination thereof and/or the like. The application may grant a conditioned approval. The conditioned approval may allow the request but indicate that the request (e.g., and similar and/or related request) must be processed according to the service parameter. The service parameter may adjust the current service level (e.g., bandwidth, priority, service limitations) to a lower or higher service level.

The access device 108 may be configured, based on the message, to process (e.g., allow, allow using the service parameter, deny) requests associated with the identifier. The access device 108 may update a stored blocklist to include any identifiers sent from the application service 104. In some scenarios, the access device 108 may be configured to remove the identifier from the blocklist, if the deadline is past or expired (e.g., a deadline may have an expiration date indicating that the deadline is no longer valid and/or should be reset to another day/time). The access device 108 may remove the identifier from the blocklist if an additional message is received from the application service 104 (e.g., or task management service 106) indicating that the user device is allowed to access the service.

The access device 108 may comprise a computing device, a gateway device, a router, a modem, a wireless access point, a combination thereof, and/or the like. The access device 108 may be at least one of: associated with a user account comprising the user profile, configured to provide the network service for the user account, or located at a premises associated with the user account.

FIGS. 2A-E show example views of a user interface. The user interface may comprise a user interface of an application, such as an application on a user device. The user interface may comprise any of the user interface described herein, such as the user interface of FIG. 1. The user interface may be a user interface for managing access to a network service, such as a service for connecting to the Internet. Though a network service is described, the user interface may be used for controlling access to any other service, such as a gaming service, content service, television service, application service, social media service, electronic mail service, chat service, and/or the like.

Figure 2A:
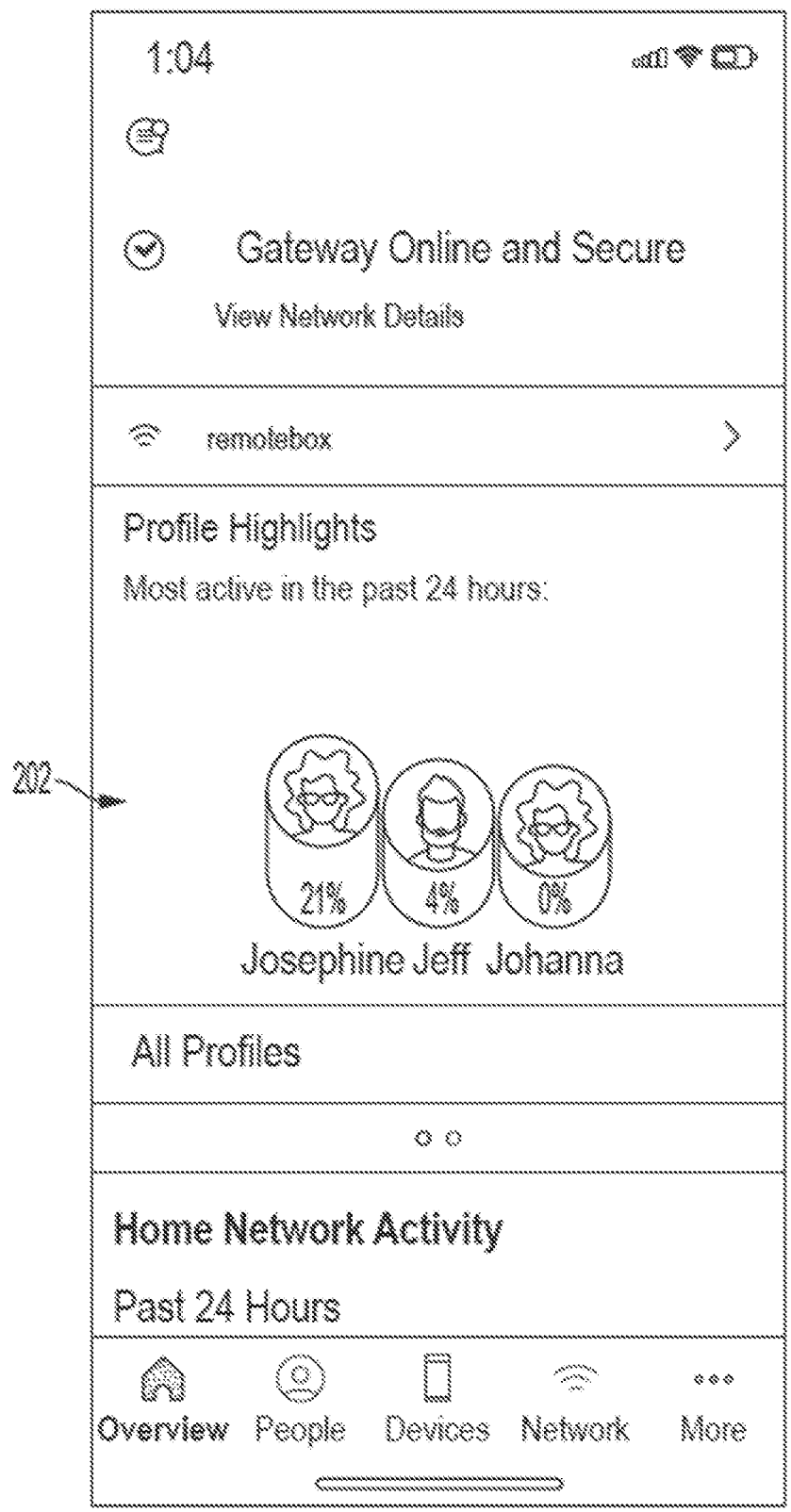
FIG. 2A is a diagram showing an example view of a user interface.

FIG. 2A is a diagram showing an example view of the user interface in which profile information 202 is shown. The profile information 202 may comprise information for different user profiles associated with an account (e.g., shown as Josephine, Jeff, Johanna). Each profile may correspond to a different member of a household. A primary user profile may be associated with a primary user (e.g., the person who established the account with the network service). One or more secondary user profiles may be controlled by the primary user. As shown in FIG. 2A, the user interface may display usage information associated with the network service for the different user profiles of the user account.

Figure 2B:
FIG. 2B is a diagram showing an example view of a user interface.

FIG. 2B is a diagram showing an example settings view of a user interface. The settings view allows users to configure settings for one or more services, such the network service. The settings view may comprise a bedtime mode settings module 204 for setting a time at which the network service is inaccessible by one or more user settings. The settings view may comprise an activity reporting module 206 for configuring notification settings. The settings view may comprise a task module 208 (e.g., to-do list module) for tracking a plurality of tasks. The plurality of tasks may be any task defined by a user, defined by a service, or a combination thereof. The task module 208 may indicate a number of tasks remaining for the day.

Figure 2C:
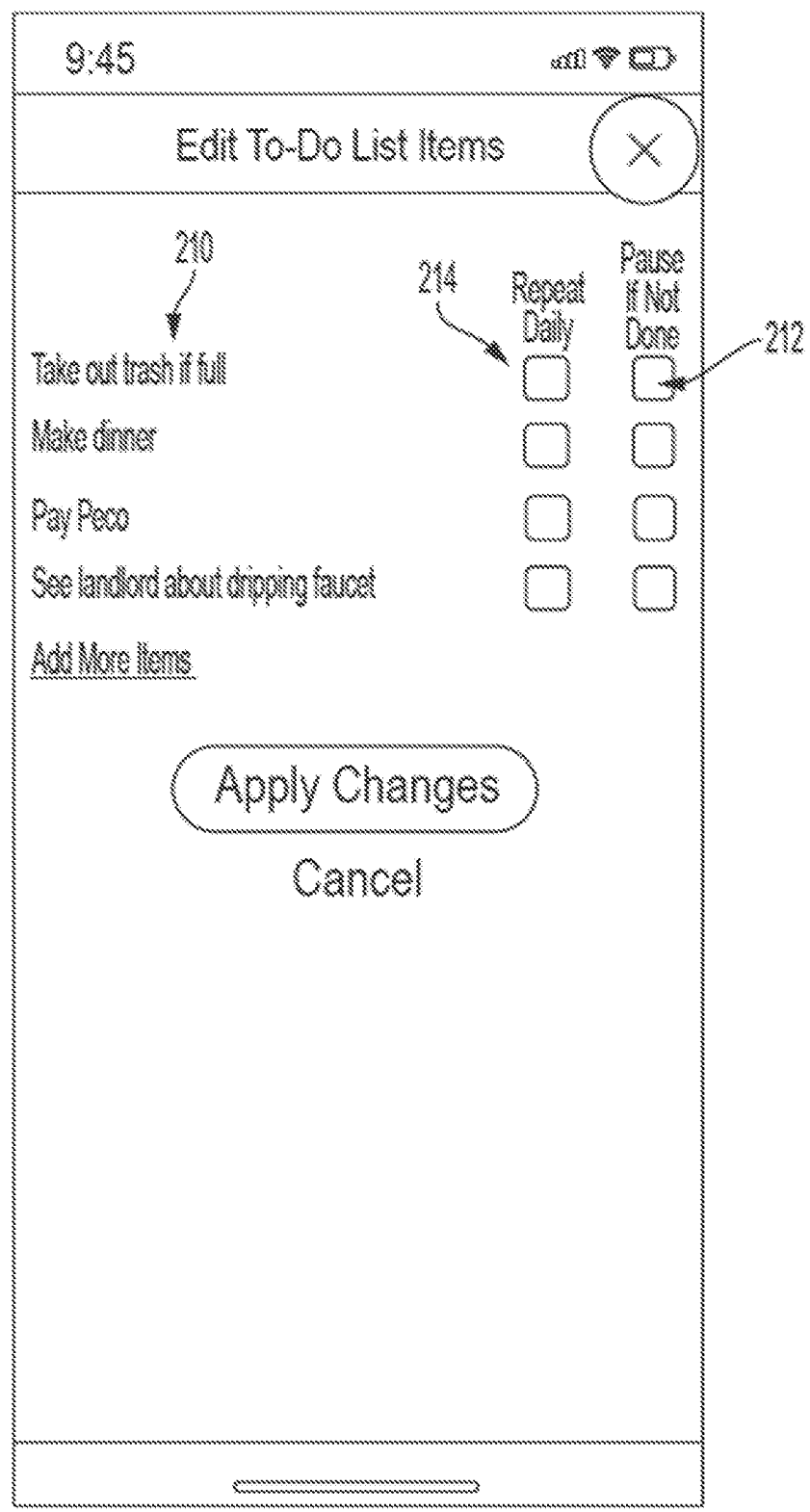
FIG. 2C is a diagram showing an example view of a user interface.
Figure 2D:
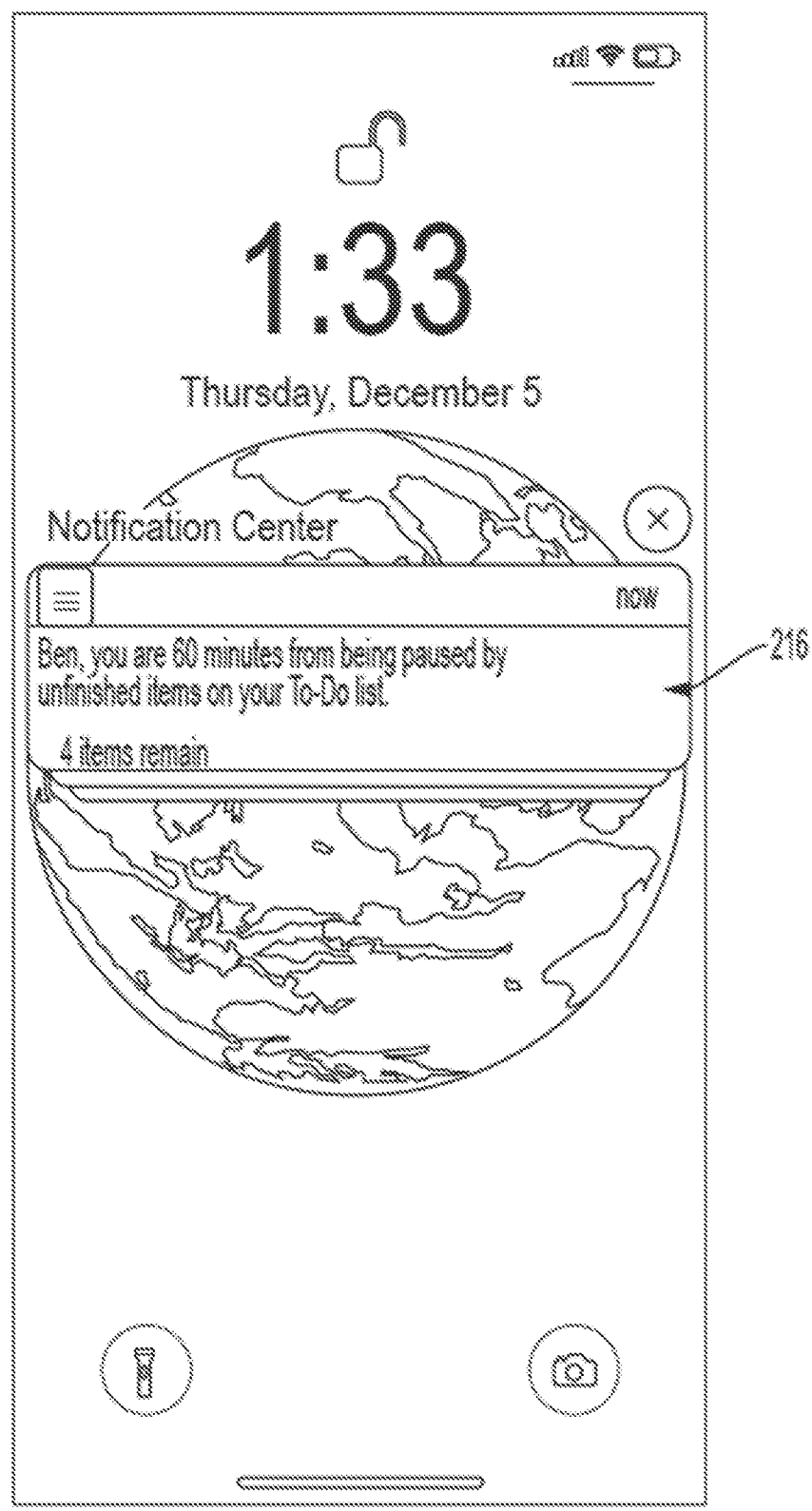
FIG. 2D is a diagram showing an example view of a user interface.

FIG. 2C is a diagram showing an example view of the task module of the user interface. The task module may allow users associated with user profiles to input tasks 210. A task 210 may be defined with a description of the task. A task 210 may be associated with a repeat option. The repeat option may be configured to require completion of the task on specific days (e.g., such as every day). A task 210 may be associated with an access condition 212. The access condition 212 may require completion of the task to obtain access to the network service. If the task (e.g., or any of the tasks) is not complete, then access to the network service may be blocked (e.g., or paused). If all the tasks associated with the access condition 212 are marked as completed, then access to the network service may be allowed. The task 210 may be associated with timing information 214, such as a daily repeat condition FIG. 2D is a diagram showing an example view of a notification 216 associated with the user interface. A user of a user profile may receive a notification 216 associated with blocking access to the network service. The notification 216 may comprise a warning that the user device may be blocked from a service (e.g., a network service) if any tasks associated with a user profile remain uncompleted by the deadline. The notification may indicate task information, such as number of tasks uncompleted, a name of a task, a number of minutes remaining to complete the task, a combination thereof, and/or the like.

Figure 2E:
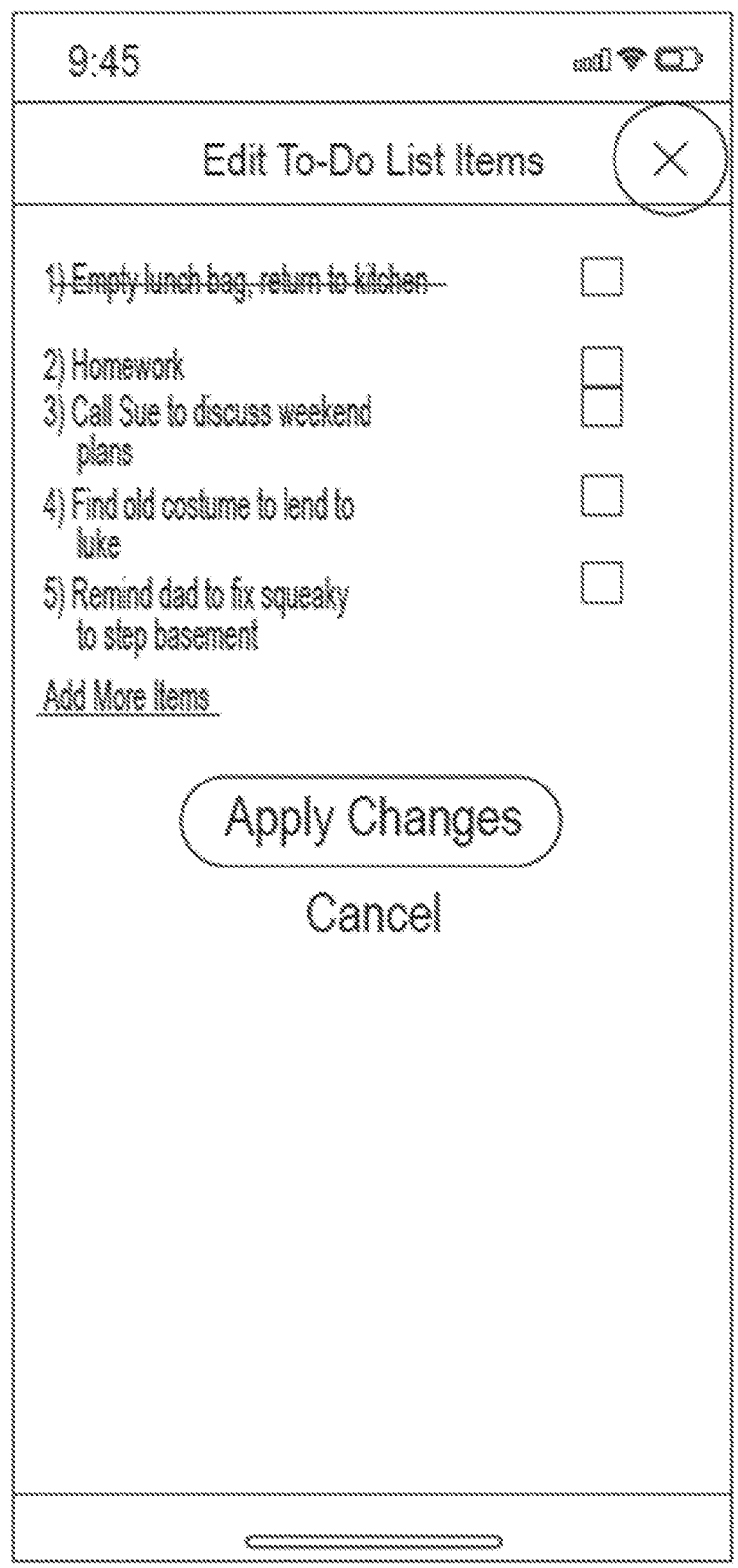
FIG. 2E is a diagram showing an example view of a user interface.

FIG. 2E is a diagram showing an example view the task module of the user interface. A user may open the task module and indicate that a task is complete. The user may be a user associated with the primary user profile, a user associated with a secondary user profile, a combination thereof, and/or the like. The user interface may show the task as crossed-out to indicate that the task is completed.

Figure 3:
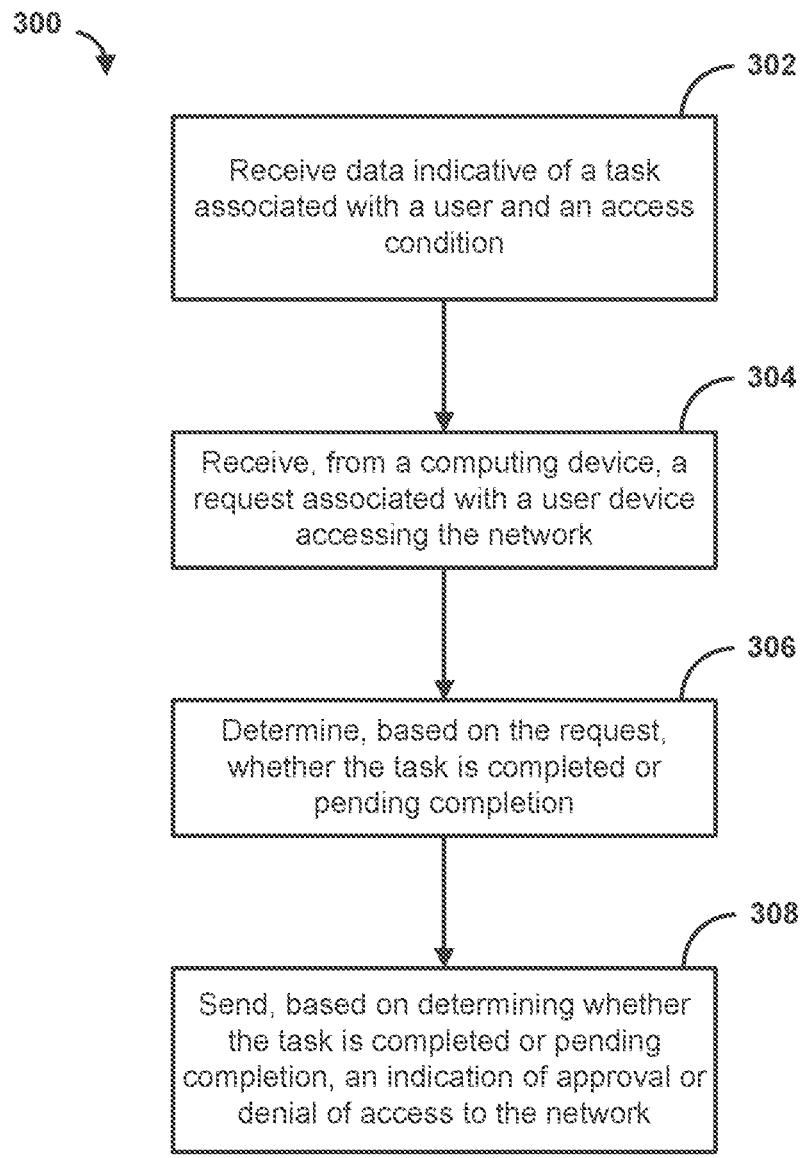
FIG. 3 is a flowchart showing an example method.

FIG. 3 is a flowchart showing an example method. The method 300 may comprise a computer implemented method for providing a service. A system and/or computing environment, such as the system 100 of FIG. 1 and/or the computing environment of FIG. 8, may be configured to perform the method 300.

At step 302, data indicative of a task associated with a user (e.g., or user profile) may be received (e.g., by a first device, computing device, server, and/or service). The data indicative of a task associated with a user may be received via a task management service. The task may be associated with an access condition for a network (e.g., or network service, content service, gaming service, access to applications, and/or the like). The access condition may comprise one or more of: a condition to enforce if the task is pending completion, a condition to enforce if the task is pending completion after a deadline, a bandwidth level, a service level, a time limit, a data usage limit, a limit on usage of an application, a limit on usage of a category of applications, blocking condition, a combination thereof, and/or the like.

Receiving the data indicative of the task associated with the user may comprise receiving an assignment of a task to the user (e.g., or user profile) and an association of the task with the access condition. Receiving the data indicative of the task associated with the user may comprise receiving, via an application comprising the task management service, the data indicative of the task. The application may be configured to manage the network (e.g., or other service).

The task management service may associate the task with the user. The task management service may allow an additional user of a primary profile of a user account to assign tasks to a secondary profile (e.g., of the user account, an account may comprise multiple user profiles) associated with the user. Access rights of the user (e.g., the secondary profile) may be controllable by the additional user (e.g., the primary profile). The task may be associated with timing information indicating a deadline for completing the task. The task may be a recurring task associated with one or more days of the week. The task may be reset after a day (e.g., week, or other time period) ends associated with the task.

At step 304, a request associated with a user device accessing the network (e.g., or other service) may be received (e.g., by the first device, the computing device, the server, and/or the service). The request associated with a user device accessing the network may be received from a computing device (e.g., a gateway device, second device, router, modem, access device, network device, server, the user device). The user device may be associated with the user (e.g., the user profile). The computing device may be at least one of: associated with a user account comprising the user profile, configured to provide the network service for the user account, or located at a premises associated with the user account.

At step 306, it may be determined (e.g., by a first device, the computing device, the server, and/or the service) whether the task is completed or is pending completion (e.g., not yet completed). The determination of whether the task is completed or is pending completion may be based on the request. A datastore comprising task information associated with the task may be accessed, queried, and/or the like. The datastore may comprise an association of one or more tasks with the user (e.g., the user profile). Each of the one or more tasks may be accessed to determine whether the corresponding task is pending completion. The datastore may comprise a field having a value that indicates whether the task is pending completion or is completed. The field may be accessed to determine whether the task is completed or pending completion.

Data indicating completion of the task may be received. The data may be sent to an additional user device associated with the additional user (e.g., primary user profile) to confirm completion of the task. If the additional user device confirms completion, then it may be determined that the task is completed (e.g., not pending completion).

At step 308, an indication of approval or denial of access to the network (e.g., or other service) may be sent. The message indicating approval or denial of access to the network may be sent based on determining whether the task is completed or is pending completion. If the task is pending completion (e.g., and the deadline for the task is not reached), the indication may indicate approval of access to the network. The indication may indicate denial if the time associated with the request matches the timing information. A determination may be made as to whether a time associated with the query matches the timing information. If the timing information indicates that the current time is still within a grace period (e.g., before the deadline), then access to the network may be approved even if the task is pending completion.

The indication may indicate (e.g., or be sent with) one or more of the access condition or a service parameter based on the access condition. The service parameter may comprise a setting, configuration, instruction, and/or other data that configures the computing device to enact the access condition (e.g. or a service level based on the access condition). The approval may be a conditioned approval. The service parameter (e.g., or the access condition) may comprise a bandwidth limitation, service tier (e.g., high bandwidth, low bandwidth, priority level), time limit, list of allowed services, list of blocked services, data usage limit, list of allowed content channels, and/or the like.

The user device may be associated with an identifier. The identifier may comprise at least one of a network address or a media access control address. The computing device may be configured, based on the indication, to process (e.g., allow, deny, allow with a specific service level, allow with one or more restrictions) requests associated with the identifier. The indication may comprise (e.g., or be sent with) a blocklist (e.g., or permission list) comprising the identifier (e.g., and any other identifiers associated with other user devices used by the profile.

A primary user (e.g., associated with primary user profile) may assign an example task of "complete chores" (e.g., or any other task) to a secondary user (e.g., associated with a secondary user profile). The task may be indicated as a daily task. The task may be associated with an access condition indicating that the task must be completed by 5 pm on the assigned day for access to a television service (e.g., or network service, gaming service). The secondary user may do a chore, such as doing the dishes, and upload a picture showing completion of the chore (e.g., empty sink) to a task management application. A notification may show up on a device of the primary user indicating the photo and/or a request to verify completion. The primary user may view the picture and mark the task as completed. If the access condition of 5 pm is a grace period, then the secondary user may continue to access the television service after 5 pm. If the access condition requires the task to be completed before access to the service, then access to the television service may be enabled.

Figure 4:
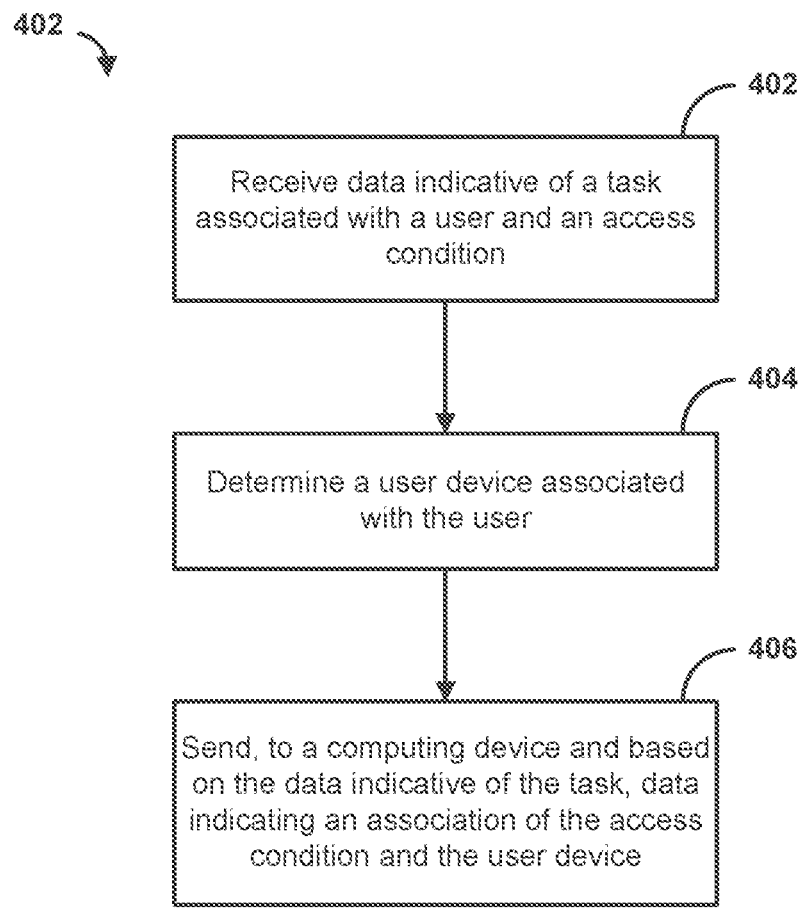
FIG. 4 is a flowchart showing an example method.

FIG. 4 is a flowchart showing an example method 400. The method 400 may comprise a computer implemented method for providing a service. A system and/or computing environment, such as the system 100 of FIG. 1 and/or the computing environment of FIG. 8, may be configured to perform the method 400.

At step 402, data indicative of a task associated with a user (e.g., or user profile) may be received (e.g., by a first device, a computing device, access device, a server, and/or a service). The data indicative of a task associated with a user may be received via a task management service. The task management service may associate the user with the task. The task may be associated with an access condition for a network (e.g., network service, or other service, television service, gaming service, device management service). The access condition may comprise one or more of: a condition to enforce if the task is pending completion, a condition to enforce if the task is pending completion after a deadline, a bandwidth level, a service level, a time limit, a data usage limit, a limit on usage of an application, a limit on usage of a category of applications, blocking condition, a combination thereof, and/or the like.

Receiving the data indicative of the task associated with the user may comprise receiving an assignment of a task to the user (e.g., user profile) and an association of the task with the access condition. Receiving the data indicative of the task associated with a user may comprise receiving, via an application, the data indicative of the task. The application may comprise the task management service. The application may be configured to manage the network (e.g., or other service). The task management service may allow an additional user of a primary profile of a user account to assign tasks to the user (e.g., or a secondary profile associated with the user) of the user account. Access rights of the user (e.g., the secondary profile) may be controllable by the additional user (e.g., the primary profile).

The task may be associated with timing information. The timing information may indicate a deadline for completing the task. The data indicating the access condition may comprise a time period for enforcing the access condition. The time period may be based on the timing information. The task may be a recurring task associated with one or more days of the week. The access condition may be reset after a day ends associated with the task.

At step 404, a user device associated with the user (e.g., user profile) may be determined (e.g., by the first device, the computing device, access device, the server, and/or the service). A datastore, such as a database, may be accessed, queried, and/or the like. The datastore may comprise associations of user profiles with corresponding identifiers of user devices. In some scenarios, multiple user devices (e.g., mobile phone, tablet, television, computing workstation) may be associated with a user (e.g., user profile). One or more identifiers of corresponding user devices (e.g., including an identifier of the user device) may be determined based on accessing the datastore.

At step 406, data indicating an association of the access condition with the user device may be sent. The data indicating the association may be sent to a computing device (e.g., gateway device, server device, access device, router, user device, modem). The data indicating the association of the access condition and the user device may be sent based on the data indicative of the task. The data indicating the association may comprise a service parameter based on the access condition. The service parameter may comprise a setting, configuration, instruction, and/or other data that configures the computing device to enact the access condition (e.g. or a service level based on the access condition). The service parameter (e.g., or the access condition) may comprise a bandwidth limitation, service tier (e.g., high bandwidth, low bandwidth, priority level), time limit, list of allowed services, list of blocked services, data usage limit, list of allowed content channels, and/or the like.

The computing device may be configured to process, based on the access condition (e.g., or the service parameter), requests by the user device associated with the network (e.g., or other service). In some scenarios, the computing device and the user device may be the same device. In other scenarios, the computing device may comprise a gateway device (e.g., located at a premises associated with user profile), a server device (e.g., associated with the network service, located external to the premises), and/or the like. The user device may be associated with an identifier. The identifier may comprise at least one of a network address or a media access control address. The computing device device may be configured, based on the access condition, to process (e.g., allow, allow with service parameter, deny) requests associated with the identifier. The computing device may be configured to, based on the data indicating the association of the access condition and the user device, enforce a service level, bandwidth, time limit, and/or other access condition.

The computing device may be associated with a user account associated with the user (e.g. or a user account comprising the user profile), configured to provide the network service for the user account, or located at a premises associated with the user account, or a combination thereof. The user device may be configured to connect to the computing device to access the network (e.g., or other service).

Data indicating completion of the task may be received. The data may be sent to an additional user device. The additional user device may be associated with an additional user (e.g., primary user profile) to confirm completion of the task. It may be determined that the task is completed. Data indicating removal of the access condition may be sent to the computing device. The data indicating removal of the access condition may be sent based on the determining that the task is completed.

A primary user (e.g., the primary user profile) may access an application to assign an example task of "walking the dog" to a secondary user (e.g., secondary user profile). It should be understood that any other task may be used. The application may be used to manage access to a network. The application may be associated with a network service provider. The task may have an access condition indicating no access to a gaming service (e.g., or other network service, internet service) until the dog has been walked. The assignment of the task may cause an application service to determine a list of identifiers (e.g., media access control addresses) associated with the secondary user profile. The list of identifiers may be sent to a computing device (e.g., gateway device, access device, user device) at a premises associated a user account of the primary user profile. The user associated with the secondary profile may attempt to access the gaming service. The gaming service may comprise a service on a gaming device, a service on the gateway device, and/or a combination thereof. The computing device may be configured to receive a message.

The message may be analyzed to determine that the message is associated with accessing the gaming service. The message may comprise a uniform resource locator comprising one or more portions indicative of the gaming service (e.g., domain name, deep link location). The computing device may block the message if the message is associated with the secondary user and/or any identifier associated with the secondary user profile. If the user goes on a walk with the dog, an application on the user's device may capture location data indicative of the walk. The user may be prompted (e.g., based on the location data being determined to indicate a walk) to indicate completion of the task, the task may be completed automatically, and/or the like. Completion of the task may cause sending of a message to the computing device to no longer block access to the gaming service for any requests associated with the list of identifiers.

Figure 5:
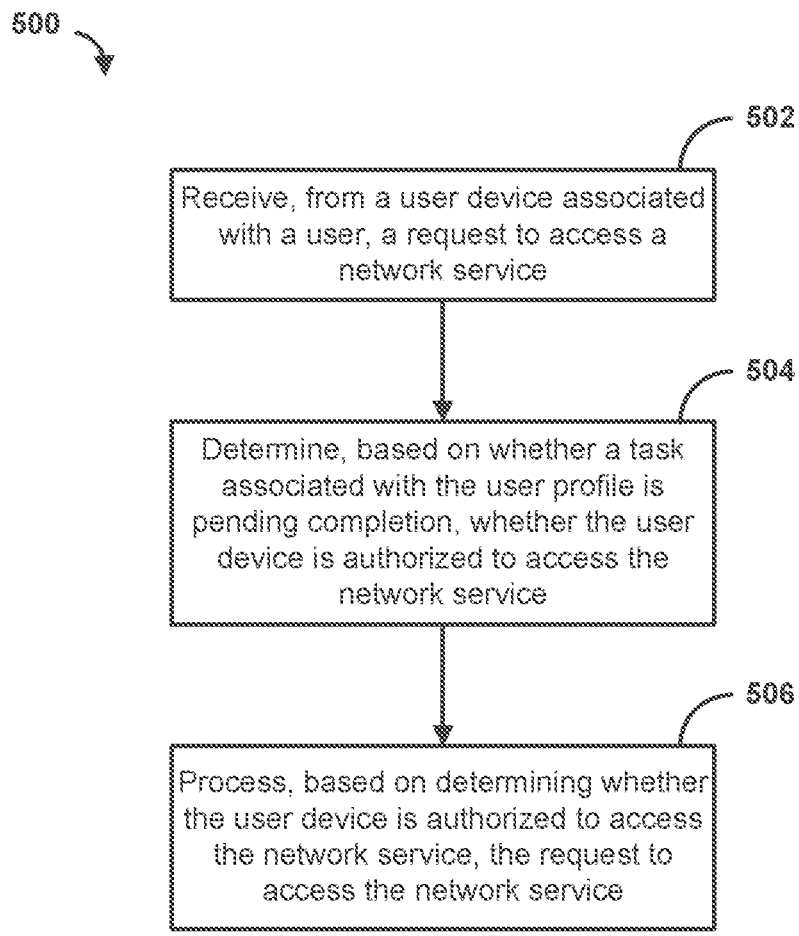
FIG. 5 is a flowchart showing an example method.

FIG. 5 is a flowchart showing an example method 500. The method 500 may comprise a computer implemented method for providing a service. A system and/or computing environment, such as the system 100 of FIG. 1 and/or the computing environment of FIG. 8, may be configured to perform the method 500.

At step 502, a request to access a network (e.g., network service, or other service, gaming service, television service, video service, audio service, streaming service, service associated with an application) may be received. The request to access the network may be received by a computing device (e.g., or gateway device, server, service, application module). The request to access the network may be received from a user device associated with a user (e.g., or user profile). The computing device may be associated with a user account associated with the user (e.g., or comprising the user profile), configured to provide the network for the user account, or located at a premises associated with the user account, or a combination thereof.

At step 504, it may be determined (e.g., by the gateway device, another computing device, the server, the service, the application module) whether the user device is authorized to access the network (e.g., or other service). The determination of whether the user device is authorized to access the network may be performed by the computing device. Access to the network by the user device may be based on whether a task associated with the user profile is pending completion (e.g., or is completed). The task may be associated with the user profile via a task management service.

Determining whether the user device is authorized to access the network may comprise sending a request to an additional computing device to access information associated with the task to determine whether the task is pending completion (e.g., or is completed). An access condition associated with the user device may be received by the computing device. The access condition may be based on whether the task is pending completion. Determining whether the user device is authorized may comprise processing the access condition to determine if an identifier of the user device matches an identifier associated with the access condition.

The task management service may be part of an application configured to manage the network (e.g., or other service). The task management service may allow an additional user of a primary profile of a user account to assign tasks to the user (e.g., or assign tasks to a secondary profile associated with the user). Access rights of the user (e.g., the secondary profile) may be controllable by the additional user (e.g., the primary profile).

The task may be associated with timing information indicating a deadline for completing the task. Determining whether the user device is authorized to access the network service may comprise determining, based on the timing condition, whether the user device is authorized to access the network service. The task may be a recurring task associated with one or more days of the week. An access condition used for determining whether the user device may be authorized may be reset after a day (e.g., or other time period, week, month) ends associated with the task.

Determining whether the device is authorized to access the network may comprise determining an access condition associated with the task. A determination may be made as to whether the access condition is satisfied if the request is processed. The access condition may comprise one or more of: a condition to enforce if the task is pending completion, a condition to enforce if the task is pending completion after a deadline, a bandwidth level, a service level, a time limit, a data usage limit, a limit on usage of an application, a limit on usage of a category of applications, or blocking condition.

At step 506, the request to access the network may be processed (e.g., by the computing device, gateway device, the server, the, service, and/or the application module). The request to access the network may be processed based on determining whether the user device is authorized to access the network service. Processing the request may comprise allowing or blocking the request. Blocking the request may comprise ignoring the request, sending a message indicating the request is blocked, a combination thereof, and/or the like.

The user device may be associated with an identifier. Processing the request may comprise comparing the identifier to a blocklist. The identifier may comprise at least one of a network address or a media access control address. The computing device may be configured to allow or deny requests associated with the identifier.

Processing the request may comprise one or more of approving the request, denying the request, limiting bandwidth for the request, applying a service parameter to the request, increasing bandwidth for the request, processing the request according to a service level, a combination thereof, and/or the like. The service level and/or bandwidth may be based on the access condition. If the access condition indicates using a lower bandwidth until the task is completed, the request (e.g., or data stream associated with the request) may assigned and/or processed with a lower bandwidth (e.g., according to a service parameter associated with the access condition). In some scenarios, completion of the task may be associated with a higher bandwidth, higher service tier, higher time limit than corresponding the bandwidth, service tier, time limit associated with the task while the task is pending and/or associated with default parameters. The task may be used as an incentive to give access to greater bandwidth, more services, higher time limits than are ordinary set as default parameters for the user profile.

A user may access a user device, such as a mobile device, at a premises associated with the user. The user device may connect to an access device, such as gateway device, for a network service. The user device may input a web page and/or otherwise navigate using an application on the user device. This input may trigger sending a request for content. The request may be sent to the access the device (e.g., which may be configured as a router). The access device may query a server to determine whether the user device is authorized to access the network service. The server may query a data store to determine if any tasks are pending completion for a user profile associated with the user device. The server may determine that an exercise task is still pending but has a grace period of 5 pm. If the current time is 4:30 pm, the grace period is not over and the network access may be granted. The request may be passed along to the next destination. If another request is received from the user device after 5 pm, the request may be denied based on the task not being complete. The denial may trigger an application on the user device to output a notification indicating that the task is not yet completed.

Figure 6:
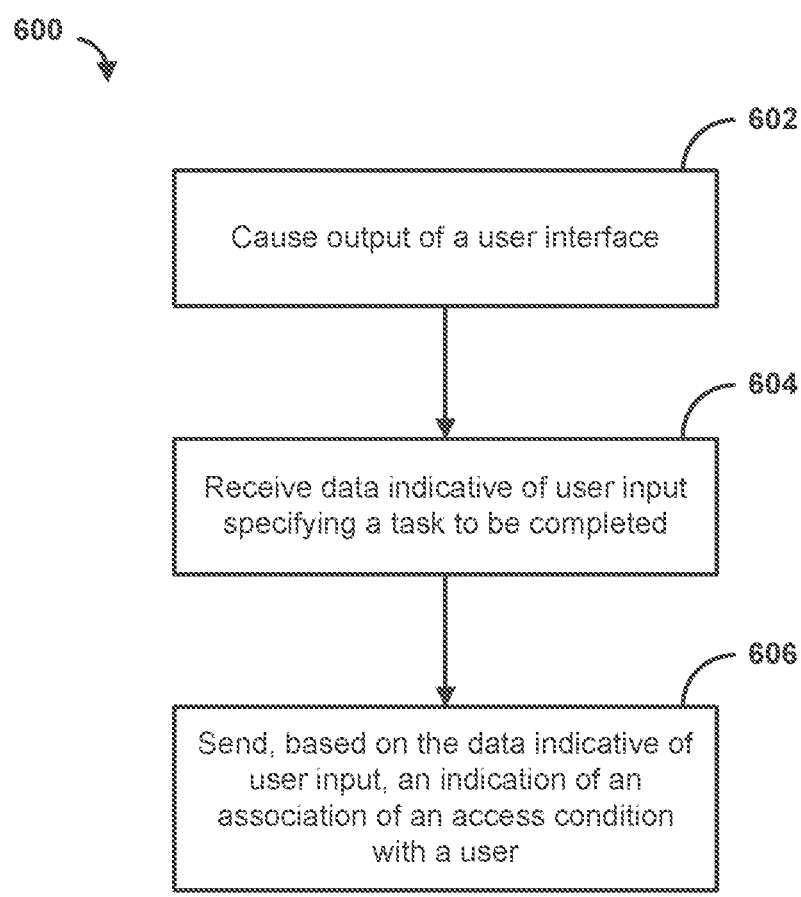
FIG. 6 is a flowchart showing an example method.

FIG. 6 is a flowchart showing an example method 600. The method 600 may comprise a computer implemented method for providing a service. A system and/or computing environment, such as the system 100 of FIG. 1 and/or the computing environment of FIG. 8, may be configured to perform the method 600.

At step 602, output of a user interface may be caused. The output may be caused by a first device, such as a computing device, user device, mobile device, streaming device, smart device, content device, and/or the like. The user interface may be output by an application, such as an application for managing a network, an application for managing a task management application, or a combination thereof. The user interface may show a view for a user logged in to the user interface. The user may be associated with a primary user profile of an account.

At step 604, data indicative of user input specifying a task to be completed may be received. The task may be associated with the first user (e.g., primary user profile), a second user (e.g., associated with a secondary user profile), or a combination thereof. The task may be assigned (e.g., via the user interface) to the second user. The task may have a description and/or task name identifying the task. The task may be associated with (e.g., via the user interface) an access condition. The access condition may comprise any access condition described herein. The user interface may allow the first user to input the task name along with any deadlines, service parameters (e.g., bandwidth level, service tier, access list of applications/service, block list of services/applications, time limit, data usage limit), deadlines, and/or the like.

At step 606, an indication of an association of the access condition with a user (e.g., user profile, user device, user account) may be sent. The user may be the first user and/or the second user. The indication may be sent to a computing device (e.g., a second device, gateway device, server device). The indication may be sent based on the data indicative of user input. The computing device may be associated with the second user. The computing device may comprise an access device, such as gateway device, a server, a router, an access point, and/or the like. In some scenarios, the computing device may be a user device, such as a mobile device, laptop, tablet, smart device, virtual reality device, and/or the like. The computing device may process (e.g., allow, conditionally allow, block) any requests associated with the user based on the access condition.

A message associated with the task may be received. The user interface and/or a device comprising the user interface may output the message. The message may comprise a notification that the task was completed. The message may comprise a request to verify completion of the task. The request to verify completion of the task may comprise media associated with the task, such as a picture, video, audio, and/or the like. The user may review the media and indicate via the user interface whether the task is completed or not. If the task is indicated as completed, a message may be sent to the computing device indicating one or more of completion of the task, expiration of the access condition, and/or the like.

Figure 7:
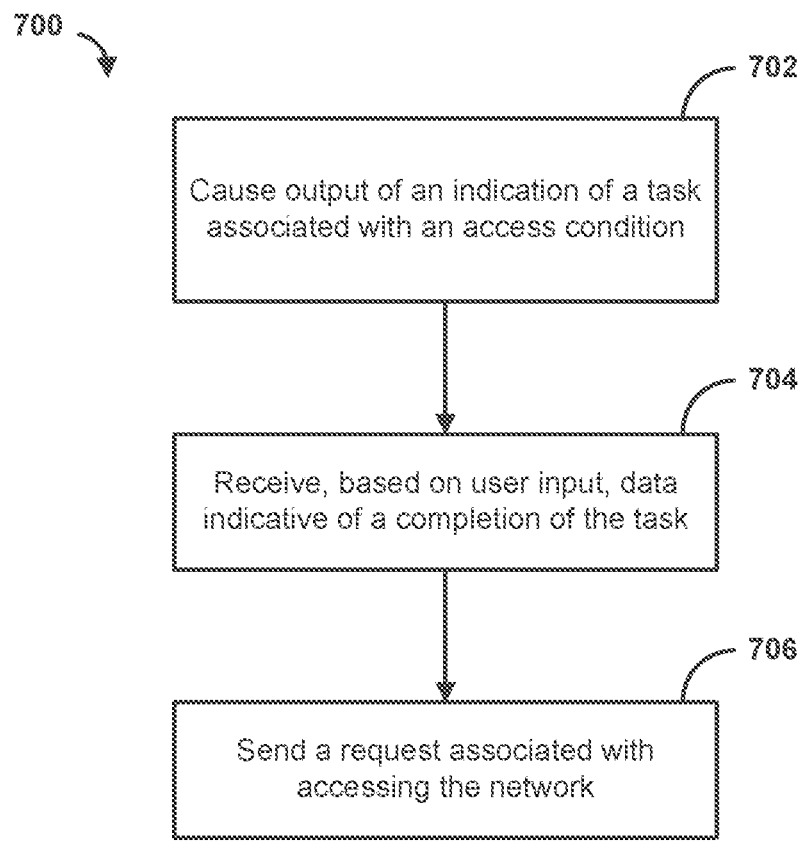
FIG. 7 is a flowchart showing an example method.

FIG. 7 is a flowchart showing an example method 700. The method 700 may comprise a computer implemented method for providing a service. A system and/or computing environment, such as the system 100 of FIG. 1 and/or the computing environment of FIG. 8, may be configured to perform the method 700.

Data indicative of a task may be received. The data indicative of the task may comprise an access condition associated with the task. The access condition may comprise any access condition described herein. The data indicative of the task may be received by a first device, such as computing device, user device, mobile device, tablet, streaming device, content device, gaming device, and/or the like.

At step 702, output of an indication of the task may be caused. The first device may cause output of the indication of the task. The indication of the task may be output via a user interface (e.g., on a display of the first device). The user interface may indicate that the task is assigned to a user logged in to the user interface. The user interface may indicate the access condition. The indication of the task may be output as a notification (e.g., via a notification pane) on the first device.

A first request associated with accessing a network (e.g., or other service) may be sent. The user may provide user input indicating an attempt to access a website, open an application (e.g., that utilizes a network), turn on a television, turn on a gaming device, and/or the like. The user input may trigger sending the first request. The first request may be sent to a second device, such as a gateway device, server, router, access point, and/or other access device. The second device may process the request by comparing an identifier received in the request (e.g., identifier of the first device) to a list of one or more identifiers. The one or more identifiers may be associated with an access condition, service parameter, or a combination thereof. If the access condition indicates the network (e.g., or other service) is blocked due to the passing of a deadline associated with a pending task, the request may be rejected (e.g., or processed with a lower service level according to the service parameter). In some implementations, the first request may be sent to and/or processed by another service on the first device, such as a proxy service, network filtering service, content management service, and/or the like.

At step 704, data indicative of a completion of the task may be received. The data indicative of the completion of the task may be received based on user input. The user may access the user interface to view the task. The user may indicate that the task is completed by marking the task (e.g., checking a check box) as completed. In some scenarios, a message requesting evidence of the completion may be output. The user may capture a picture and/or other media and attach the media to the task. The media may be sent to a user device associated with a user that assigned the task. The user that assigned the task may verify that the task is completed or indicate that the task is not completed. The user that assigned the task may send an explanation of the task along with the indication that the task is not completed.

An indication of one or more of the completion of the task or an expiration of the access condition may be sent. The indication may be sent based on receiving the data indicative of the completion of the task. The indication may be sent to the second device, the other service on the first device, a combination thereof, and/or the like.

At step 706, a request (e.g., a second request) associated with accessing the network (e.g., or other service) may be sent. The request may be sent to the second device, the other service on the first device, a combination thereof, and/or the like. The second device may process the second request. If the access condition indicates the network (e.g., or other service) is allowed (e.g., due to the passing of a task), the second request may be granted.

Figure 8:
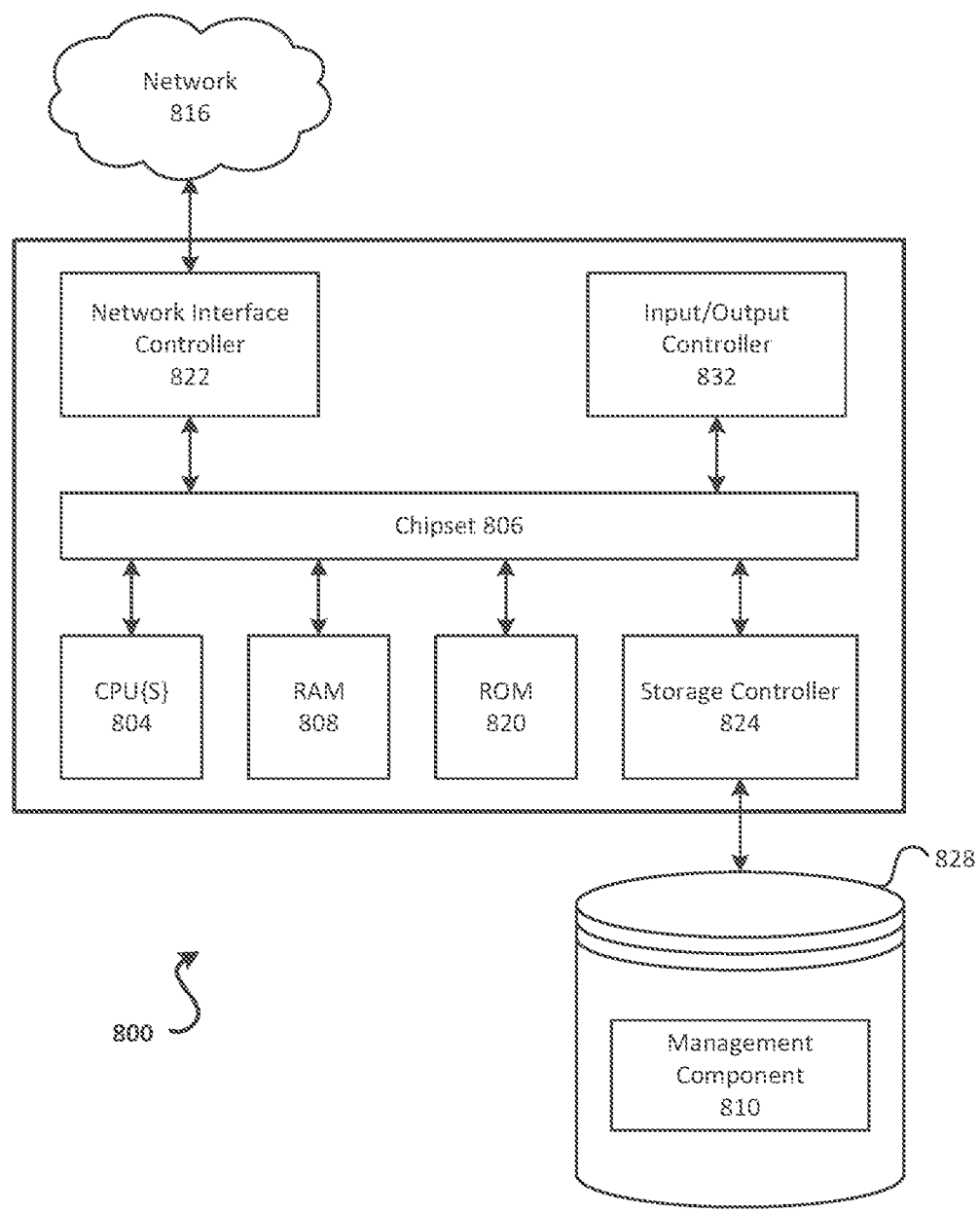
FIG. 8 is a block diagram illustrating an example computing device.

FIG. 8 depicts a computing device that may be used in various aspects, such as the servers, modules, and/or devices depicted in FIG. 1. With regard to the example architecture of FIG. 1, the content service 102, the application service 104, task management service may (e.g., may each separately, or together) be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2A-E, and FIGS. 3-7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described in relation to FIGS. 2A-E, and FIGS. 3-7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
    receiving data indicative of a task to be performed by a user, wherein the task is associated with an access condition for a network;
    receiving, from a computing device, a request associated with a user device accessing the network, wherein the user device is associated with the user;
    determining, based on the request, whether the task is completed or is pending completion; and
    sending, based on whether the task is completed or pending completion, an indication of approval or denial of access to the network, wherein the computing device is configured to approve or deny access to the network by the user device based on whether a network identifier associated with the user device is stored in a list of the computing device.

2. The method of claim 1, wherein the access condition comprises one or more of: a condition to enforce if the task is pending completion, a condition to enforce if the task is pending completion after a deadline, a bandwidth level, a service level, a time limit, a data usage limit, a limit on usage of an application, a limit on usage of a category of applications, or blocking condition.

3. The method of claim 1, wherein the approval is a conditioned approval and the indication of approval or denial indicates one or more of the access condition or a service parameter based on the access condition.

4. The method of claim 1, wherein receiving the data indicative of the task to be performed by the user comprises receiving an assignment of the task to the user and an association of the task with the access condition.

5. The method of claim 1, wherein receiving the data indicative of the task to be performed by the user comprises receiving, via an application comprising a task management service, the data indicative of the task, wherein the application is configured to manage the network.

6. The method of claim 1, wherein a task management service that associates the task with the user allows an additional user of a primary profile of a user account to assign tasks to a secondary profile associated with the user, wherein access rights of the secondary profile are controllable by the primary profile.

7. The method of claim 1, wherein the task is associated with timing information indicating a deadline for completing the task, and further comprising determining whether a time associated with the request matches the timing information, wherein the indication of approval or denial indicates denial if the time associated with the request matches the timing information.

8. A method comprising:
receiving data indicative of a task to be performed by a user, wherein the task is associated with an access condition for a network;
determining a user device associated with the user; and
sending, to a computing device and based on the data indicative of the task, data indicating an association of the access condition with the user device, wherein if the task is not completed, the computing device is configured to process, based on the access condition, requests by the user device associated with accessing the network, and
wherein the computing device is configured to process requests by the user device based on whether a network identifier associated with the user device is stored in a list of the computing device.

9. The method of claim 8, wherein the access condition comprises one or more of: a condition to enforce if the task is pending completion, a condition to enforce if the task is pending completion after a deadline, a bandwidth level, a service level, a time limit, a data usage limit, a limit on usage of an application, a limit on usage of a category of applications, or blocking condition.

10. The method of claim 8, wherein the data indicating the access condition comprises a service parameter based on the access condition.

11. The method of claim 8, further comprising:
determining that the task is completed; and
sending, to the computing device and based on the determining that the task is completed, data indicating removal of the access condition.

12. The method of claim 8, wherein receiving the data indicative of the task to be performed by the user comprises receiving an assignment of the task to the user and an association of the task with the access condition.

13. The method of claim 8, wherein receiving the data indicative of the task to be performed by the user comprises receiving, via an application comprising a task management service, the data indicative of the task, and wherein the application is configured to manage the network.

14. The method of claim 8, wherein the task is associated with timing information indicating a deadline for completing the task, and wherein data indicating the access condition comprises a time period, based on the timing information, for enforcing the access condition.

15. A method comprising:
receiving, by a computing device and from a user device associated with a user, a request to access a network;
determining, by the computing device, whether the user device is authorized to access the network, wherein access to the network by the user device is based on whether a task to be performed by the user is pending completion; and
processing, based on determining whether the user device is authorized to access the network, the request to access the network, wherein the computing device is configured to approve or deny access to the network by the user device based on whether a network identifier associated with the user device is stored in a list of the computing device.

16. The method of claim 15, wherein processing the request comprises one or more of allowing the request, denying the request, applying a service parameter to the request, limiting bandwidth for the request, or processing the request according to a service level.

17. The method of claim 15, wherein determining whether the user device is authorized to access the network comprises determining an access condition associated with the task and determining whether the access condition is satisfied if the request is processed.

18. The method of claim 15, wherein determining the user device is authorized to access the network comprises sending a request to an additional computing device to access information associated with the task to determine whether the task is pending completion.

19. The method of claim 15, further comprising receiving, by the computing device, an access condition associated with the user device, wherein the access condition is based on whether the task is pending completion, wherein determining whether the user device is authorized comprises processing the access condition to determine if an identifier of the user device matches the network identifier.

20. The method of claim 15, wherein a task management service allows an additional user of a primary profile of a user account to assign tasks to a secondary profile associated with the user, wherein access rights of the secondary profile are controllable by the primary profile.

21. The method of claim 1, wherein the external service comprises one or more of a homework service, a project management service, or a content submission service.

22. The method of claim 1, further comprising receiving, from the external service, an indication of completion of the task.

23. The method of claim 1, wherein the task management service is managed by a first service provider and the external service is managed by a second service provider separate from the first service provider.

24. The method of claim 1, wherein the user device comprises an application that allows the user to manage the network and to manage tasks, wherein the network is a local area network at a premises associated with the user.

25. The method of claim 1, wherein the list comprises a blocklist of media access control addresses.

* * * * *